United States Patent
Matsuyama et al.

(10) Patent No.: US 6,714,271 B1
(45) Date of Patent: Mar. 30, 2004

(54) LIQUID CRYSTAL DISPLAY HAVING AN IN A PIXEL ELECTRODE ALONG A BOUNDARY OF DIFFERENTLY ORIENTED REGIONS

(75) Inventors: Hiroaki Matsuyama, Tokyo (JP); Yoshihiko Hirai, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/533,075

(22) Filed: Mar. 22, 2000

(30) Foreign Application Priority Data

Mar. 24, 1999 (JP) .......................................... 11/080184

(51) Int. Cl.[7] ..................... G02F 1/136; G02F 1/1337; G02F 1/1333
(52) U.S. Cl. .................... 349/123; 349/43; 349/129; 349/130; 349/138
(58) Field of Search ................... 349/123, 129, 349/130, 43, 138

(56) References Cited

U.S. PATENT DOCUMENTS

| | | | | |
|---|---|---|---|---|
| 5,136,407 | A | * 8/1992 | Clerc | .......................... 349/146 |
| 5,729,230 | A | 3/1998 | Jensen et al. | |
| 5,912,717 | A | 6/1999 | Sugiyama et al. | |
| 5,953,093 | A | * 9/1999 | Hirata et al. | .................. 349/143 |
| 5,963,290 | A | * 10/1999 | Murai et al. | .................. 349/191 |
| 5,995,176 | A | * 11/1999 | Sibahara | ...................... 349/44 |
| 6,040,885 | A | * 3/2000 | Koike et al. | ................. 349/129 |
| 6,147,722 | A | * 11/2000 | Shimada et al. | .............. 349/43 |
| 6,157,428 | A | * 12/2000 | Koma | ......................... 349/138 |
| 6,191,836 | B1 | 2/2001 | Woo et al. | |

FOREIGN PATENT DOCUMENTS

| | | |
|---|---|---|
| JP | 3-259121 | 11/1991 |
| JP | 6-194656 | 7/1994 |
| JP | 7-122558 | 5/1995 |
| JP | 2778500 | 8/1996 |
| JP | 9-211468 | 8/1997 |
| JP | 2755131 | 3/1998 |
| JP | 10-142608 | 5/1998 |
| JP | 10-505479 | 5/1998 |
| JP | 11-142854 | 5/1999 |
| JP | 2000-155317 | 6/2000 |
| KR | 95-126628 | 5/1995 |
| KR | 99-006951 | 1/1999 |

* cited by examiner

Primary Examiner—Julie-Huyen L. Ngo
(74) Attorney, Agent, or Firm—McGinn & Gibb, PLLC

(57) ABSTRACT

In an LCD, according to the present invention, an electrode 3 is made up of a transparent film such as indium tin oxide (ITO) and is formed on top of transparent substrate 1. An aperture 5, with its width W being equal to or longer than the width x of the defectively oriented region C, is formed on both the electrode 3 and the substrate 1. An alignment layer 10, made of a transparent insulating film, is formed on top of the electrode 3. The surface of the alignment layer 10 is subjected to an optically orienting process using UV rays. Thereby, differently oriented regions that orient respective liquid crystal molecules 15, 16 and 14 almost perpendicular to the surface of the alignment layer 10 when no electric field is applied via the electrode 3, are generated on the alignment layer 10. An electrode 4, made of a transparent conductive film such as an ITO, is formed on the underside of transparent substrate 2. Alignment layer 11, made of a transparent insulating film is formed on the underside of the electrode 4. The surface of the alignment layer is subjected to the above optical orienting process. Thereby, differently oriented regions are generated on the alignment layer 11 in an identical manner to that of generating them on the alignment layer 10.

7 Claims, 12 Drawing Sheets

(A)

(B)

(A)

(B)

LIQUID CRYSTAL DISPLAY HAVING AN IN A PIXEL ELECTRODE ALONG A BOUNDARY OF DIFFERENTLY ORIENTED REGIONS

BACKGROUND OF THE INVENTION

1. Field of the Invention

The present invention relates to a liquid crystal display (LCD) and its manufacturing method.

2. Description of the Related Art

Conventionally, twisted nematic-type (TN-type) LCDs or electrically controlled birefringence-type (ECB-type) LCDs have been in wide use. However, because of the uniformly oriented alignment of liquid crystal molecules inside a pixel at the time of voltage application, the color tone changes depending on the viewing angle. In order to reduce this problem relating to the viewing angle, there are techniques to differentiate the oriented alignments of the liquid crystal molecules within each pixel or to divide the region of liquid crystal molecules into differently oriented regions. Using this oriented alignment division, the visual property of each region is compensated with those of the surrounding regions so that a display with a wide-angle field of view can be produced. In particular, when the vertical orientation method (one of the ECB-type methods) is employed, a faster response speed than the TN system can be obtained. Furthermore, due to the improved black display, attention has been focused on the vertically oriented alignment division techniques.

Techniques such as rubbing and optical orientation have been used to orient the liquid crystal molecules. However, because rubbing utilizes a treatment where the alignment layer comes into contact with a cloth in a wiping-like manner, problems can easily develop due to molecules breaking down from static electricity or the substrate being contaminated with foreign dust particles. On the other hand, because the optical orientation process utilizes a non-contact treatment to orient the alignment layer, the above problems related to rubbing techniques do not develop. Therefore, the optical orientation process is seen as a superior technique.

Techniques for performing oriented alignment divisions using the optical vertical orientation method are described in Japanese Patent Application Laid-open Nos. Hei 9-211468 and Hei 10-142608. In each of these techniques, a photo mask is used, and an optical orientation treatment is performed on each of the orienting regions based on their respective irradiation condition.

Here is a brief explanation of the techniques described in the above Japanese Patent Application Laid-open No. Hei 9-211468. First, the principle of this optical orientation technique will be explained using FIGS. 1(A) to 1(C). As shown in these figures, top of the substrate 1 is coated with an ultraviolet (UV) ray inducting alignment layer (in this case a vertical alignment layer made of a polyimide). On the surface of the alignment layer 18 are CH chains 19, and the average direction of these CH chains 19 is parallel to the normal of the substrate 1. However, the directions of the respective CH chains are dispersed (varied). In other words, it is considered that they face all directions within each imaginary plane parallel to the substrate surface. If UV rays irradiate from the direction 22 diagonal to the alignment layer 18, parts of the CH chains with their directions being parallel to the direction that the UV rays travel, absorb the UV rays, and thus are cut off or disintegrate. The degree of UV ray absorption depends on the direction of each CH chain on the alignment layer 18 as well as the direction of, the UV ray irradiance, with the highest level of absorption occurring when the direction 23 of the electric field of the UV ray coincides with the direction of the CH chain.

After the UV ray irradiation has occurred, a certain direction (marked with an 'X' in FIG. 1(A)) of CH chain is cut off or disintegrated on the alignment layer 18, whereas the other (marked with an 'O' in FIG. 1(A)) is left intact. Then, as shown in FIG. 1(B), the direction 21 parallel to the remaining CH chains leans away from the normal of the substrate 1.

As shown in FIG. 1(C), when the liquid crystal molecules 24 come into contact with the surface of the oriented film 18, they are slanted so as to run along in the same directions as CH chains 19. The same treatment as described above is applied to two substrates, and in order for the slant of the liquid crystal molecules on the surface of the alignment layer of each substrate to be somewhat parallel to each other, the two substrates are arranged to face each other maintaining a fixed interval between them. The liquid crystal filling between the substrates is liquid crystal with a negative dielectric anisotropy. Applying a certain voltage to the electrode forces the angle of the slant of the liquid crystal molecules 24 relative to the normal of the substrate to increase on their own from the initial angles, eventually becoming parallel to the substrate. In short, a uniform orientation is able to be obtained.

Next, the process of oriented alignment division will be explained. As stated above, the oriented direction is dependent upon the condition of the irradiating light: mainly the irradiating angle and the condition of the light polarization. Accordingly, in order to differentiate the oriented direction of each region, it is necessary to change the condition of the irradiating light in each region. It is common for a photo mask to be used to allow a specific light to hit a specified region, but not allow it to hit the other regions. The process of oriented alignment division can be executed by repeatedly and selectively irradiating light using the photo mask in proportion to the number of oriented alignment divisions.

Furthermore, in Japanese Patent Application Laid-open Hei 10-142608, other techniques besides the above techniques relating to alignment layer materials, the condition of light irradiance (light polarization, angle of light irradiance, volume of light irradiated), orientation of the liquid crystal, and mode of liquid crystal are mentioned, however, the process of oriented alignment division is the same as in the above technique.

Nevertheless, with the conventional technique described above, a problem arises where the alignment at the boundary between the divided regions easily becomes unstable. The reason for this is that regions of over-exposure and under-exposure tend to develop depending on how accurately the photo mask is matched. Also, because the liquid crystal cannot be regulated on these areas of over-exposure and under-exposure, it is easy for a poor orientation to occur. Moreover, those areas of poor orientation may be the core cause of the normally oriented regions of liquid crystal molecules becoming disturbed. This problem will be further discussed below using FIGS. 2(A) and 2(B) and FIGS. 3(A) and 3(B).

As described above, an optical orientation process is performed through the irradiation of UV rays diagonal to the alignment layer. Accordingly, a photo mask is used when an oriented alignment division is performed. In other words, as shown in FIG. 2(A), when subjecting the left region of the alignment layer 26, which is on top of the substrate 25, to an optical orientation process, the right region is masked by the photo mask 27 (the first condition). Under this first condition, UV rays 31 are irradiated from the diagonal direction 29. Next, as shown in FIG. 2(B), when optically orienting the right region of the alignment layer 26, which is placed on top of the substrate 25, the left region is masked by the photo mask 28 (the second condition). Under this second condition, UV rays 32 are irradiated from the diagonal direction 30. Through this process, the liquid crystal molecules in the left region on the surface of the alignment layer 26 are slanted to the left, whereas the liquid crystal molecules in the right region are slanted to the right. As a result, two orienting regions with different orientations are formed.

However, the following problems occur on the boundary of each region of the alignment layer that has gone through an oriented alignment division. FIG. 3(A) shows the case where the differing conditions of the UV rays 33 and 34 are both irradiated to the alignment layer resulting in developing a double-exposed region 35, whereas FIG. 3(B) shows the case where an unexposed region develops. It is considered that the former case is caused by the poor alignment accuracy of the photo mask or the diffraction resulting from diagonally irradiated light. The liquid crystal molecules above/on the double-exposed region 35 can possibly be slanted in different directions than just left or right according to the aforementioned optical orientation process. On the other hand, the liquid crystal molecules above/on the under-exposed region 36 are able to maintain their vertical orientation. Accordingly, each of the situations shown in FIGS. 3(A) and 3(B) causes the liquid crystal molecules to slant in different directions than expected when a certain voltage is applied. Moreover, the poorly oriented regions 35 and 36 adversely effect the areas where proper light irradiation has occurred so that the poorly oriented area might expand.

Besides the above problems with the aforementioned boundary, there is also a problem with the alignment accuracy with which the substrates are aligned and fixed. Namely, when a pair of substrates are each put through the optical orientation process, and then put face to face so that the oriented directions of one of the substrates can fit those of the other, a discrepancy in the position may occur due to the limitation of the alignment accuracy. In this case, the alignment layer on one of the substrates may not fit the oriented directions of the liquid crystal molecules on the surface of the alignment layer that is placed on the other substrate. As a result, in the same way as the previous case, a poorly oriented alignment may occur.

Japanese Patent No. 2778500 mentions a technique where the aperture is formed on the electrode at the boundary region of the oriented alignment division. However, yet this technique is one relating to the TN mode. It has nothing to do with a technique of the vertical orientation mode where liquid crystal molecules are either vertically or almost vertically pre-oriented and they turn to be oriented horizontally when a certain voltage is applied.

Besides this, according to Japanese Patent Application Laid-open Hei 6-0434461, the directions of vertically oriented liquid crystal molecules are controlled by a structure with the aperture on the electrode, but without performing an orientation treatment such as rubbing or an optical orientation. However, there is a problem with the response time of this technique. Namely, since with this technique, the orientation control is performed in only the region near the aperture of the electrode, the regions further away are later oriented through propagation. Moreover, since the liquid crystal molecules in the regions further away are vertically aligned at the beginning, they tend to move in random directions when the voltage is applied. Due to this, the orientation control using propagation is slowed down, and this increases the response time. The propagation delay becomes more obvious as the distant areas from the aperture become wider, or in other words, as the pixels increase in size.

SUMMARY OF THE INVENTION

Taking the above problems into account, the present invention is made. Accordingly, the objective of the present invention is to provide a newly structured LCD with the following characteristics: a superior display quality, a high-speed response time, and a low frequency of poorly oriented regions.

According to an aspect of the present invention, an LCD with each pixel being formed of a plurality of differently oriented regions of an alignment layer is provided, and is comprised of an electrode (3) with at least one aperture (5) formed along the boundary between adjacent differently oriented regions in an alignment layer (10) that is deposited on top of the said electrode (3) and also in the said aperture (5), with the said adjacent, differently oriented regions orienting the respective liquid crystal molecules (14, 15, 16), wherein the shortest allowable width W of the said aperture (5) is equal to the width (X) of the defectively oriented region in the said boundary. An example of the said LCD is illustrated in FIG. 4.

According to an aspect of the present invention, an LCD with each pixel being formed of a plurality of differently oriented regions of an alignment layer is provided, and is comprised of an electrode (3) with at least one aperture (5) formed along the boundary between adjacent differently oriented regions in an alignment layer (10) that is deposited on top of the said electrode (3) and also in the said aperture (5), with the said adjacent, differently oriented regions orienting the respective liquid crystal molecules (14, 15, 16) to be vertical or almost vertical when no electric field is applied via the said electrode (3). An example of the said LCD is illustrated in FIG. 4.

According to an aspect of the present invention, a method of fabricating an LCD is provided, and is comprised of the following steps: an aperture forming step (S1) of forming at least one aperture (5) along a to-be-formed boundary on an electrode (3), which has been placed on top of a substrate (1), with the width W of the said aperture (5) being equal to or longer than the expected width (X) of the defectively oriented region in a boundary that is to be generated later; a depositing step (S2) of depositing an alignment layer (10) over the resultant surface processed in the aperture forming step; and a generation step (S2) of generating differently oriented regions, which orient respective liquid crystal molecules, and the said boundary, which is sandwiched between the said differently oriented regions, all in the said alignment layer (10). An example of the said method of fabricating an LCD is illustrated in FIG. 5.

BRIEF DESCRIPTION OF DRAWINGS

The above and other objects, features and advantages of the present invention will become more apparent from the following detailed description, when taken in conjunction with the accompanying drawings, wherein.

DETAILED DESCRIPTION OF THE PREFERRED EMBODIMENT

LCDs, according to several embodiments of the present invention, will be described with reference to the drawings.

First Embodiment

Figure 4:
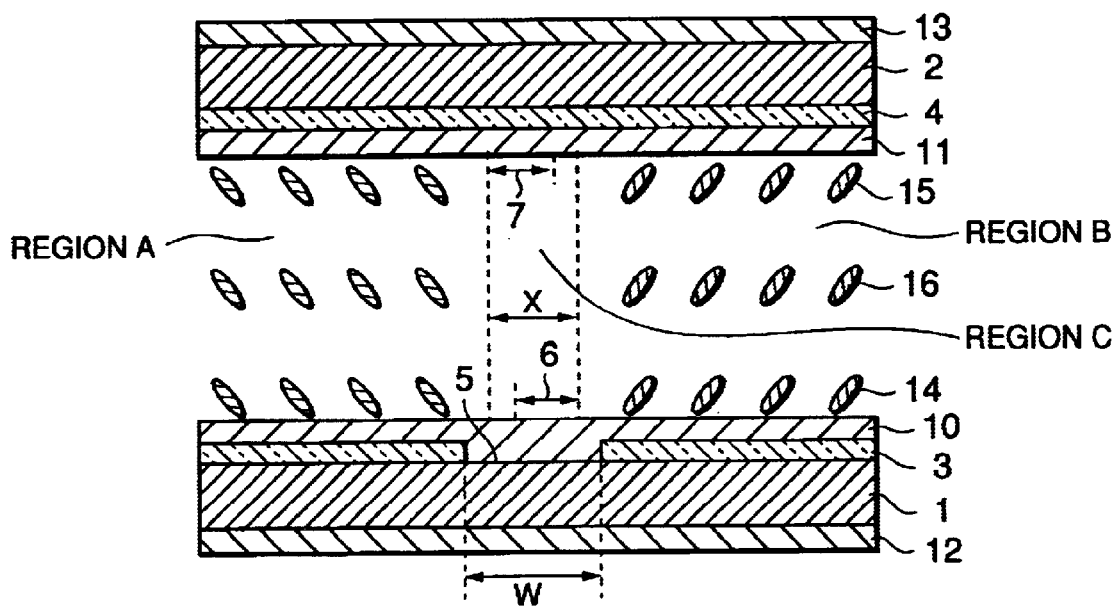
FIG. 4 is a cross section showing part of a pixel in an LCD, according to the first embodiment of the present invention.
Figure 5:
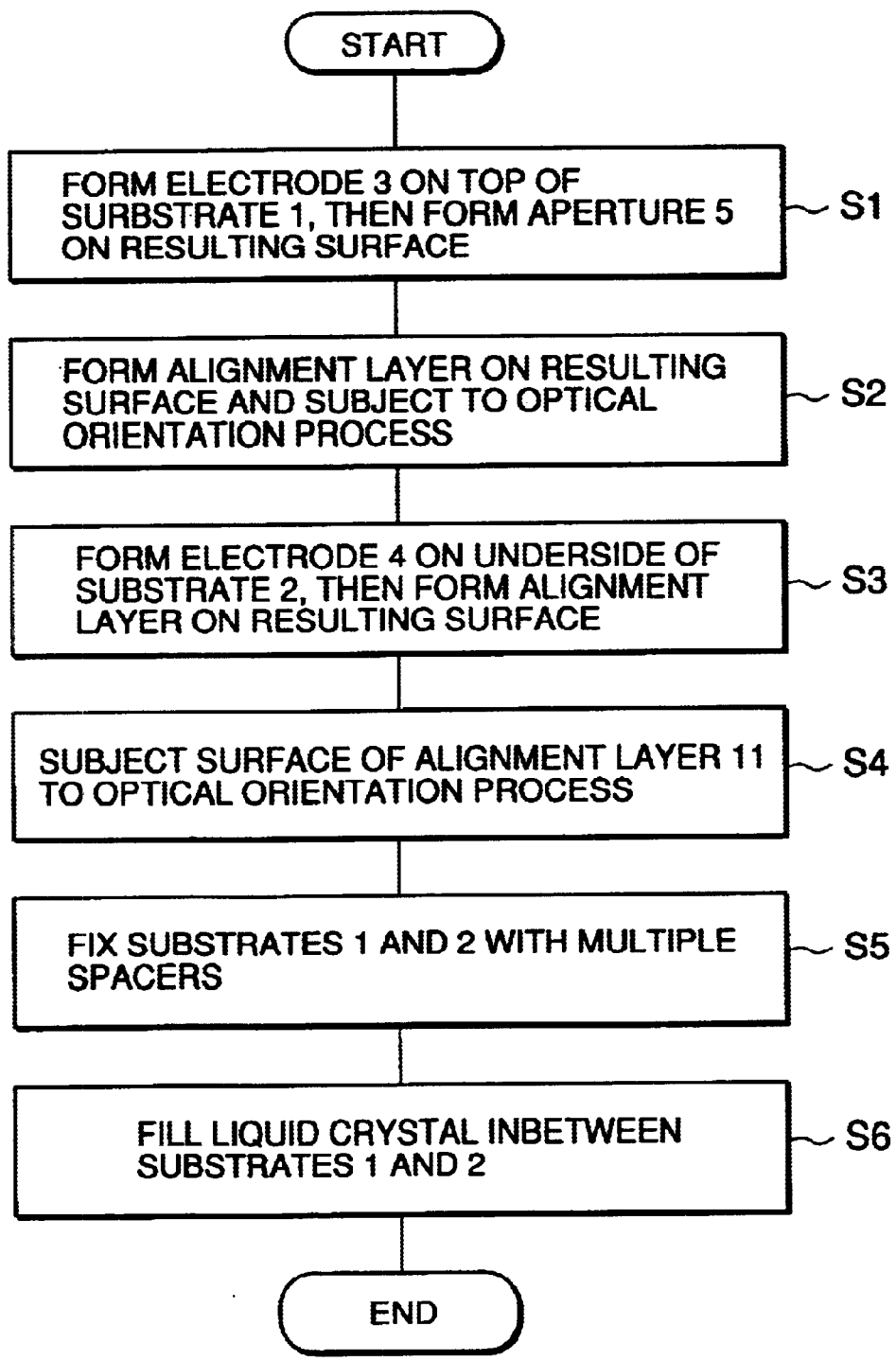
FIG. 5 is a flowchart showing the fabricating procedure for the LCD in FIG. 4.
Figure 6:
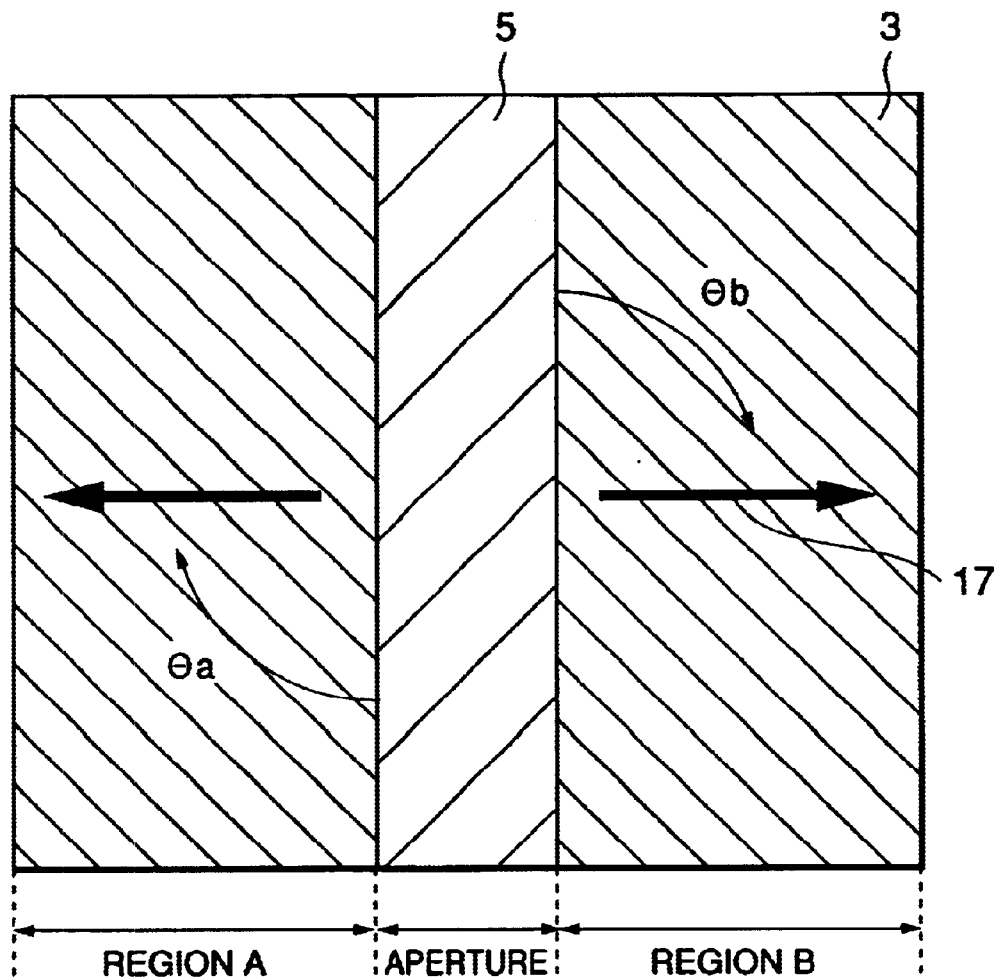
FIG. 6 illustrates the directions of the liquid crystal molecules in the LCD shown in FIG. 4, according to the first embodiment of the present invention.

An LCD and its manufacturing method of the first embodiment will be described below while referencing FIGS. 4 to 6. FIG. 4 is a cross section illustrating part of a pixel in the LCD, whereas FIG. 5 is a flowchart showing the fabrication procedure for the LCD. FIG. 6 illustrates the oriented directions of the liquid crystal molecules in the LCD.

According to the LCD of the first embodiment, an electrode 3, made up of a transparent film such as indium tin oxide (ITO), is formed on top of a transparent substrate 1 (made of a material such as glass) by sputtering. An aperture 5, extending in the direction perpendicular to the surface of FIG. 4, is then formed by a photolithography process (in step S1).

The aperture 5 with its width W being equal to, for example, 6 μm, which is equal to or longer than the width x (6 μm or shorter) of the defectively oriented region C in the format of the substrate 1 being overlapped with the substrate 2 at a certain distance, is positioned at the boundary of each region, which is later formed by orientation-dividing. This positioning is done under the following conditions: first, the width 6 of the defective optically orientated region on the substrate 1 caused by the optical orienting is equal to approximately 2 μm or less; secondly, the width 7 of a defective optically orientated region on a substrate 2 (which faces the substrate 1) caused by the optical orienting is equal to approximately 2 μm or less; thirdly, the alignment accuracy of overlapping the substrate 1 with the substrate 2 is equal to approximately 4 μm or less.

Figure 1:
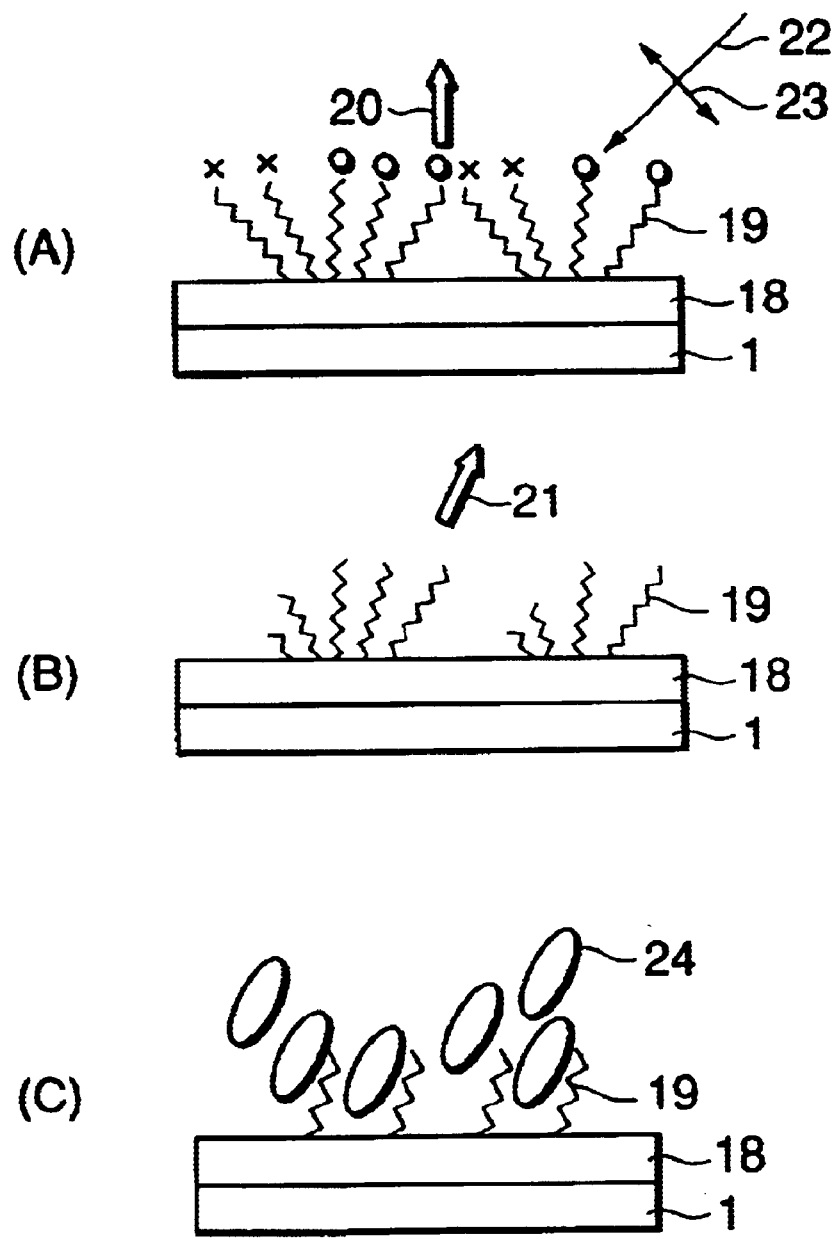
FIGS. 1(A) to 1(C) show how to optically orient the surface of an alignment layer.
Figure 2:
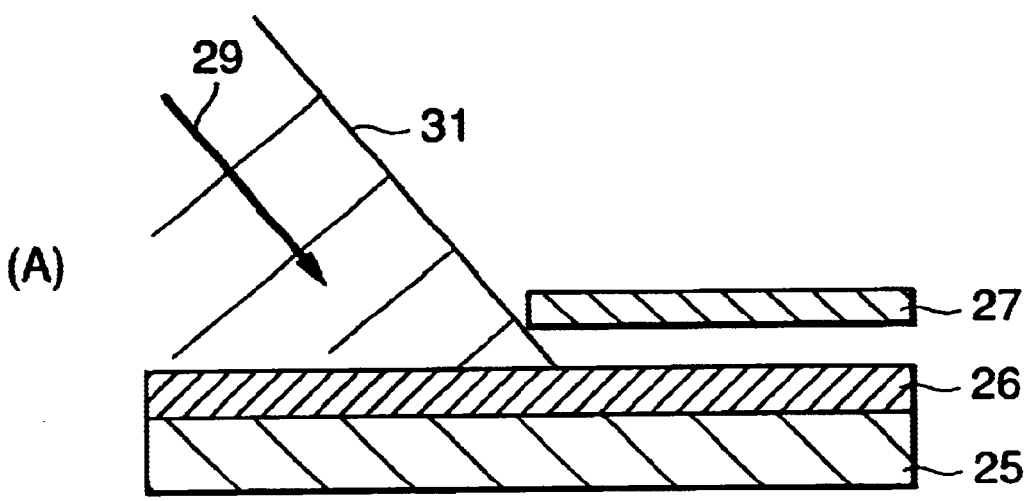
FIGS. 2(A) and 2(B) shows how to divide the alignment layer into differently oriented regions.
Figure 2:
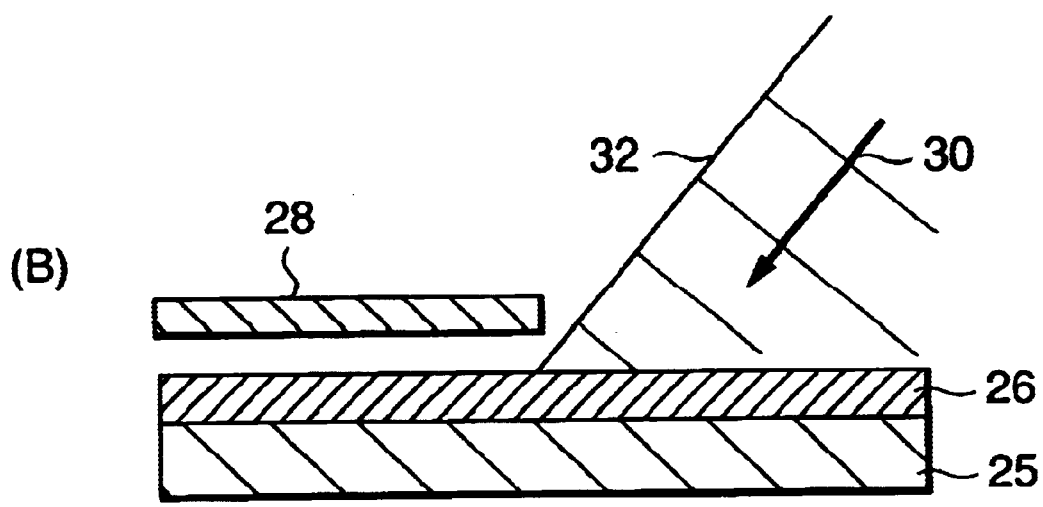
Figure 3:
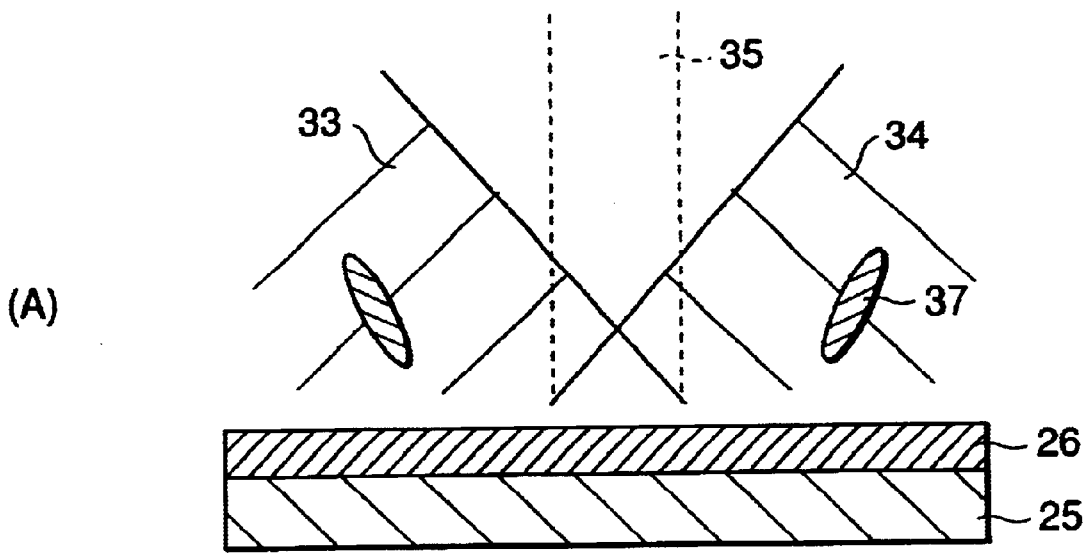
FIGS. 3(A) and 3(B) shows how a poorly oriented region is generated according to the conventional techniques.
Figure 3:
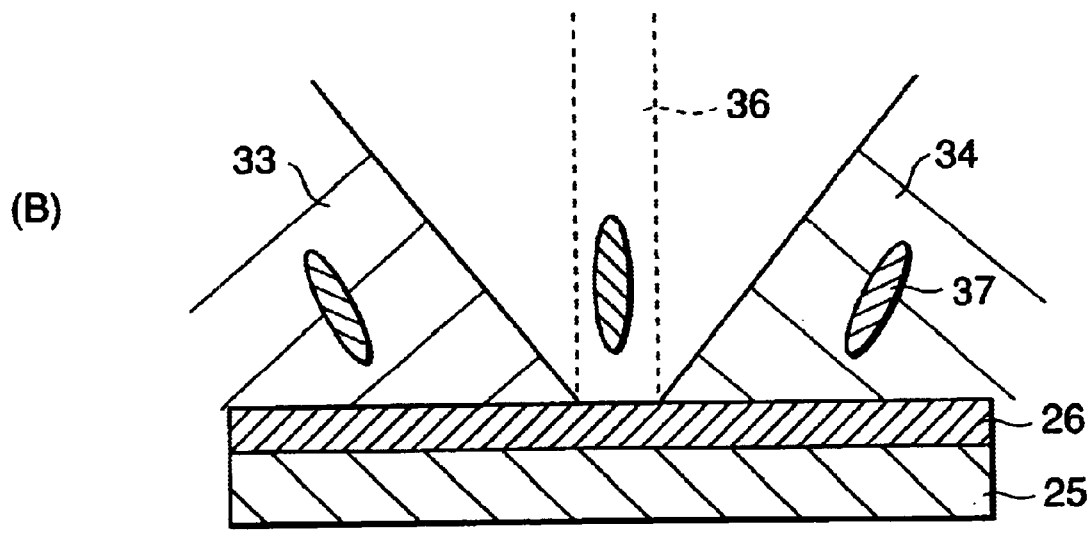

Afterwards, an alignment layer 10, made of a transparent insulating film that orients liquid crystal molecules almost perpendicular to the surface of its respective film, is formed on top of both the electrode 3, which is placed on the substrate 1, and the exposed surface of the substrate 1 (in step S2). The alignment layer 10 can be formed by, for example, offset-printing the polyimide JALS-682 (made by JSR Corporation), and then baking it for an hour at 180° C. Afterwards, an optical orienting process, as described above with reference to FIG. 2, is executed, so that: the region A in FIG. 6 is irradiated with UV rays at the left angle of 45° while the region B is covered by a photo mask; whereas the region B is irradiated with UV rays at the right angle of 45° while the region A is covered by a photo mask. Thereby, two differently oriented regions are generated with the aperture 5 on the electrode 3 as a border. However, as described before, the limitation of the photo mask alignment accuracy causes a generation of the defectively oriented region 6 with its width being equal to or shorter than approximately 2 μm. Incidentally, the longest allowable width W of aperture 5 can be equal to the width between the inner edges of the respective photo masks as described above.

Next, the structure relevant to the substrate 2 that is positioned facing the substrate 1 will be described. First, an electrode 4, made of a transparent conductive film such as an ITO, is formed on the underside of the transparent substrate 2 (made of a material such as glass) by sputtering, as shown in FIG. 4. There is no aperture formed on the electrode 4. The electrode 4 is then patterned into a square of, for example, 500 μm² (in step S3). An alignment layer 11, made of a transparent insulating film that orients the liquid crystal molecules almost perpendicular to the film surface, is formed on the underside of the electrode 4, which is already formed on the underside of the substrate 2. The alignment layer 11 can be formed by, for example, offset-printing the polyimide JALS-682 (made by JSR Corporation), and then baking it for an hour at 180° C. Afterwards, the surface of the alignment layer 11 in regions A and B, divided by their boundary or the line (which runs perpendicular to the sheet surface of FIG. 4, at the center of the two facing sides of the electrode 4 of 500 μm², and which is also perpendicular to the two sides), is subjected to an optical orienting process (in step S4). In this optical orienting process, each of the above regions A and B are optically irradiated at the respective opposite angles to those shown in FIGS. 2(A) and 2(B). That is, the region A is irradiated with UV rays at the right angle of 45° while the region B is covered by a photo mask; whereas the region B is irradiated with UV rays at the left angle of 45° while the region A is covered by a photo mask. Thereby, two differently oriented regions are generated. However, as described before, the limitation of the photo mask alignment accuracy causes the generation of a defectively oriented region 7 with its width being equal to or shorter than approximately 2 μm.

Afterwards, the substrates 1 and 2 are fixed to each other supported by multiple spacers (not shown in FIG. 4) with their radius being equal to or shorter than 4.5 μm so that the substrates can face each other a certain distance apart (in step S5). At this time, the substrates 1 and 2 overlap each other via the spacers so that each orientation dividing boundary of the substrate 1 can fit its corresponding one in substrates 2. This alignment accuracy is equal to or shorter than approximately 4 μm. Thereafter, a liquid crystal with a certain negative dielectric anisotropy fills in the space between the substrates 1 and 2. MLC-6608 (made by Merck & Co., Inc.), for example, is used for the liquid crystal.

With the above process, the filled layer of the liquid crystal can be oriented in such a manner as shown in FIG. 4. That is, the divided regions A and B are formed via the defectively oriented region C with its the width x by the orientation-dividing. As a result, the directions of the oriented liquid crystal molecules in the respective regions A and B are different from each other. Liquid crystal molecules 14 to 16 in the region A are oriented slantingly at the under right position towards the upper left position in conformity with the orientations of the orientation films 10 and 11, whereas liquid crystal molecules 14 to 16 in the region B are oriented slantingly at the under left position towards the upper right position in conformity with the orientations of the orientation films 10 and 11. That is, when the regions A and B in FIG. 4 are viewed as a whole, the liquid crystal molecules 14 to 16 are oriented with the inverted shape of the Japanese character "八" as shown in FIG. 4. In more detail, the liquid crystal molecules 14 to 16 are oriented with the posture such that the more distant liquid crystal molecules in either region located outside of the aperture 5 of the electrode 3, in the direction of the normal line of the substrate 1 from the orientation film 10 are located farther away from the aperture 5 in the direction that the orientation film 10 extends. In other words, the aperture 5 is formed at the summit of the inverted Japanese character "八" shape of the liquid crystal molecules on/above the electrode 3.

As shown by the arrows in FIG. 6, the oriented direction 17 of each liquid crystal molecule in the regions A and B when projected onto the substrate 1 at the side of the electrode 3 on which the aperture 5 is formed, (i.e., the oriented direction, which results from projecting the liquid crystal molecules on the substrate 1 and which extends from the closer-to-the-substrate end of each liquid crystal molecule towards the farther end of it), points to a location going away from the aperture. Angles θa and θb to the extending direction of the aperture 5 (i.e., vertical direction in FIG. 6) are beyond 0° but smaller than 180°. The liquid crystal molecules can be arranged in twisted orientations as long as the above condition is satisfied. In other words, the oriented direction resulting from projecting the liquid crystal molecules in the regions A and B on the substrate can gradually change from the substrate 1 towards the substrate 2 so that the oriented directions of the respective liquid crystal molecules 14 on the substrate 1 side, the liquid crystal molecules 16 in the middle, and the liquid crystal molecules 15 on the substrate 2 side can be different from one another.

As shown in FIG. 4, optical films 12 and 13 are coated on the respective outer surfaces of the substrates 1 and 2. These optical films 12 and 13 can be made of either a polarizing plate or a combination of a polarizing plate and an optically compensating plate. For example, polarizing plates are coated on tops of the substrates 1 and 2 so that the absorbing axes of the respective polarizing plates can cross to each other and that the oriented directions resulting from projecting the liquid crystal molecules on the substrate can be at 45° to each absorbing axis. Moreover, an optically compensating plate with negative refractive anisotropy (retardation Δnd=−400 nm) is, pasted on top of the polarizing plate, which was previously pasted on top of the substrate 2, so that the optic axis of the optically compensating plate can be perpendicular to the surface of the polarizing plate.

The operation of the LCD of this embodiment will be described below. Applying a certain voltage between the electrodes 3 and 4 on the respective substrates 1 and 2 causes the liquid crystal molecules to orient at a slant so that the angle between each liquid crystal molecule and the substrate can decrease. The angles of the respective liquid crystal molecules 14, 15, and 16 change in conformity with the potential electric difference, which causes a change in the optical transmittance. In this embodiment, since aperture 5 is formed at the boundary that divides the orientations, the electric field around the aperture 5 caused by applying a certain voltage allows the position of the boundary between the regions A and B to be maintained (i.e., the location of the boundary is fixed). As a result, the ratio of each region A to its corresponding region B can be reproductively fixed at a constant. According to the LCD of the present invention, the aperture 5 and the alignment layer 10 as described above not only prevent the defectively oriented region from expanding but maintain the orderly oriented directions of the liquid crystal molecules in regions A and B.

Accordingly, the ratio among sub-regions (e.g., in this embodiment, the two regions A and B) in each pixel is kept constant. This does not allow the gray levels of each pixel to vary widely when viewed at various viewpoints. As a result, the LCD of the present invention can provide a clear and wide field of vision. Also, a high response characteristic is obtained.

In the above embodiment, there is a relationship of W=X. However, its opposite relationship of W<X (e.g., X=50 μm; W=6 μm) is also allowed even though its result is inferior to that of the former. The result in the case of W<X is at least better than that in the case where there is no aperture on the electrode.

Furthermore, in place of the single aperture 5 in each pixel, a broken line of multiple rectangle apertures, with each length being equal to a certain value such as 10 μm, can be alternatively formed at certain intervals of, for example, 10 μm along/over the boundary between the regions A and B. In other words, multiple conductive regions can be formed at certain intervals along/over the boundary region. It is preferable that the total length of the multiple apertures described above is equal to or greater than one-third the length of the boundary.

Furthermore, according to an experimental LCD, identical to the aforementioned LCD according to the present invention, only without the aperture on the electrode 3, it has been found that the area of each boundary largely shifts due to the applying of variable voltages. As a result, the ratio of the area of the region A to that of the region B cannot be fixed.

Furthermore, according to another experimental LCD, identical to the aforementioned LCD according to the present invention, only without being subjected to the optically orienting process described above, it has been found that a defectively oriented region can be easily generated in the vicinity of the sides of each pixel electrode, which extend so as to be perpendicular to the extending direction of the aperture. Moreover, the response speed to each of applied voltages is lower than that of the aforementioned LCD, according to the first embodiment of the present invention.

Second Embodiment

Figure 7:
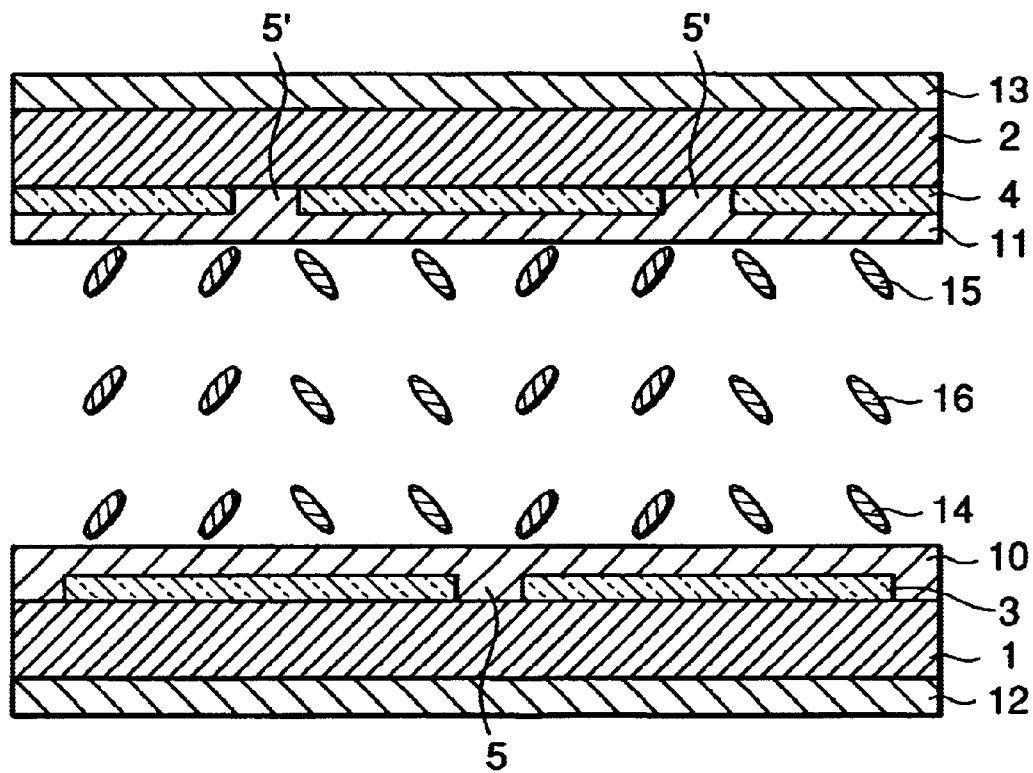
FIG. 7 is a cross section showing part of a pixel in an LCD, according to the second embodiment of the present invention.

Next, an LCD, according to the second embodiment of the present invention, will be described with reference to FIG. 7. FIG. 7 illustrates a part of a pixel in the LCD of the second embodiment. It is noted that the same functional elements as those in FIGS. 4 and 6 are assigned the same reference numerals in this figure.

In this embodiment, in addition to the aperture 5 described in the first embodiment, multiple apertures 5' are formed on the electrode 4, which is formed on the underside of the substrate 2. As shown in FIG. 7, each aperture 5' on the electrode 4, which is on the underside of the substrate 2, and the aperture 5 on the electrode 3, which is on the top of the substrate 1, are arranged to be at certain intervals in the direction parallel to either substrate. The oriented directions of the liquid crystal molecules in the region on one side of each of the apertures 5 and 5' are different from those of the liquid crystal molecules in the region on the other side of it. In other words, four individual divided regions are formed in a pixel where the respective two adjacent individual regions include differently oriented groups of the liquid crystal molecules.

Incidentally, the number of divided regions in a pixel is not limited to four. In the case of the area of each pixel being large, the number of divided regions can naturally be increased.

Furthermore, in this embodiment, the boundaries, along/over which the apertures 5 and 5' are positioned, are arranged to extend parallel to one another. However, the present invention is not limited to this. Crossing boundaries can be alternatively arranged. In this arrangement, none of the groups of oriented directions resulting from projecting each divided group of liquid crystal molecules on the substrate are parallel to any of the boundaries. For example, each group of oriented directions is formed to be at a 45° angle relative to its corresponding boundary. With this configuration, an identical result can be obtained.

Third Embodiment

Figure 8:
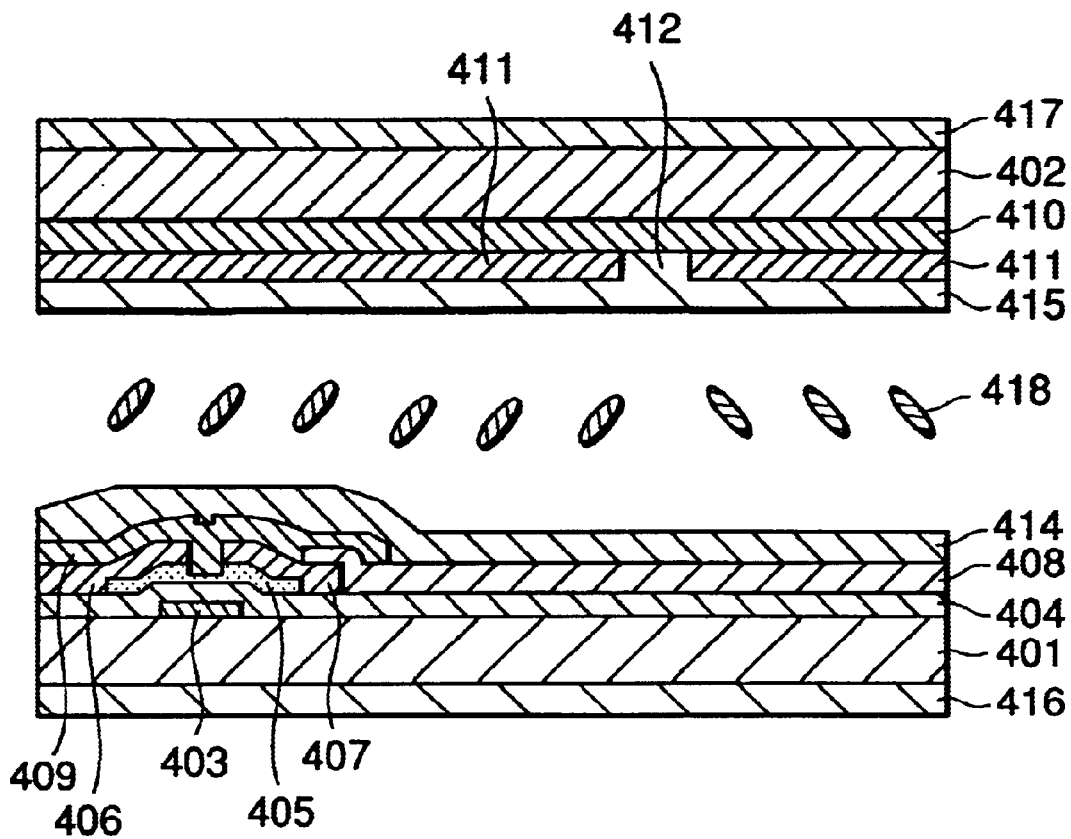
FIG. 8 is a cross section showing part of a pixel in an LCD, according to the third embodiment of the present invention.
Figure 9:
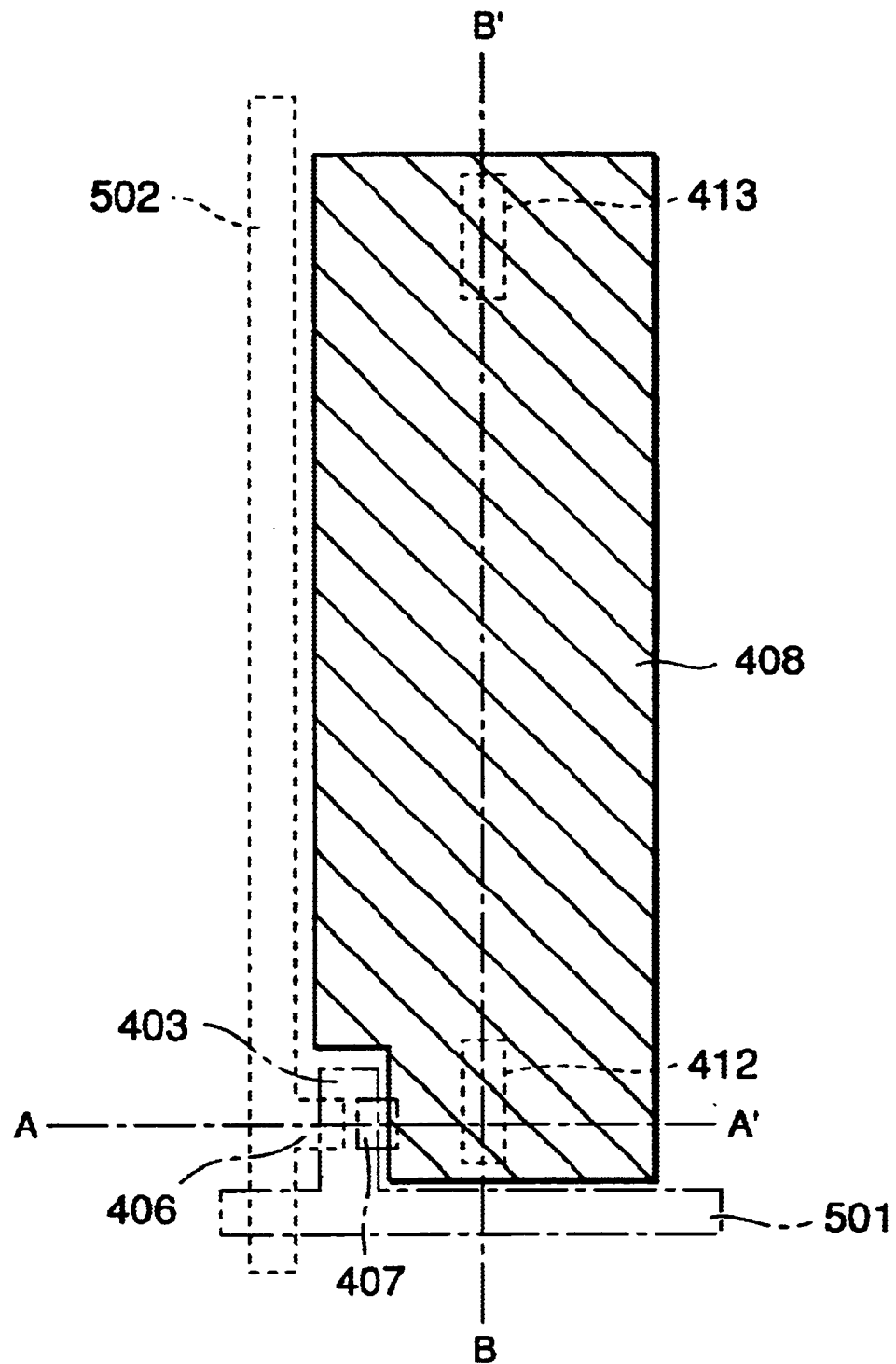
FIG. 9 is an aerial view of the upper part of the pixel in the LCD in FIG. 8.

Next, an active-matrix LCD using a TFT (Thin Film Transistor) matrix, according to the third embodiment of the present invention, and its manufacturing process will be described with reference to FIGS. 8 and 9: FIG. 8 illustrates a cross section of part of a pixel in the LCD cut along a line AA' in FIG. 9 and FIG. 9 illustrates an aerial view of part of this pixel. The LCD of the third embodiment is structured based upon the format in the first embodiment.

In FIGS. 8 and 9, first, a gate electrode 403 and a gate wiring 501 are formed on a transparent glassy substrate 401 by sputtering and a photolithography process. The gate electrode 403 and gate wiring 501 are made of either a single-layered metal film or a multiple-layered metal film, which is, for example, a Cr film, an ITO film, or a combination of these films. A gate insulating film 404, made up of two layers of a silicon nitride and silicon oxide, is then formed on the resultant surface by a chemical vapor deposition (CVD) system. Next, a semiconductor layer 405, made of an amorphous silicon (e.g., a-Si or $n^+$ a-Si), is formed on top of the previously formed gate insulating film 404 using CVD and the photolithography process. A drain electrode 406, a source electrode 407, and a drain wiring 502, each being made of either a single layered metal film, such as Cr or ITO, or a multiple layered film that is made up of, for example, the combination of these materials, are all formed on the resultant surface in the structure as shown in FIGS. 8 and 9 by sputtering and the photolithography process. With the above processes, the gate wiring 501, the drain wiring 502, and a switching TFT has been completed with being located at the intersection of the gate wiring 501 and drain wiring 502. Afterwards, a pixel electrode 408, made of a transparent conductive film such as ITO, is formed by sputtering and the photolithography process. A passivation film 409, made of a silicon nitride, is then formed using CVD and the photolithography process. An alignment layer 414, made of polyimide, is formed next, over the resultant surface. The alignment layer 414, once formed, is then subjected to an optical orientation process.

Next, a fabrication procedure for the substrate 402, which will be positioned so as to face the substrate 401, will be described. First, a color filter film 410 is formed on the underside of the transparent substrate, which is made of a material such as glass. A common electrode 411, which is shared by multiple pixels and which is made of a transparent conductive film such as an ITO film, is then formed on the underside of the color filter film 410 by sputtering and the photo lithographic process. Afterwards, apertures 412 and 413, as shown in FIG. 9, are formed on the common electrode 411 and along a boundary line BB', which indicates the boundary between the adjacent regions of different orientations. As shown in FIG. 9, the apertures 412 and 413 are located at partial areas of the boundary. However, the present invention is not limited to this. They can be longer and cover most of the boundary. Thereafter, an alignment layer 415, made of an organic film such as polyimide, is formed on the underside of the common electrode 411, and is then subjected to an optical orientation process. The optical orientation process of the alignment layers 414 and 415 is executed in an identical manner to that of the first embodiment.

Afterwards, the substrates 401 and 402 are arranged to be facing each other at a fixed interval. Liquid crystal then filled in between them. Optical films 416 and 417 are pasted next on the respective outer sides of the substrates 401 and 402. The above processes are executed in the same manner as those of the first embodiment.

It is noted that the direction of the oriented liquid crystal molecules 418 are opposite to that of the first embodiment as shown in FIG. 4 since the aperture 412 on the electrode 411 is fixed at the upper level. The directions resulting from projecting the directions of the oriented liquid crystal molecules onto the substrate in FIG. 6 are equal to those resulting from projecting those of the oriented crystal liquid molecules 418 onto the substrate 402 in FIG. 8. Naturally, the result of the third embodiment as described above is the same as that of the first embodiment.

Furthermore, in the third embodiment, two apertures 413 and 412 are formed on the electrode 408. However, the present invention is not limited to this. More than two apertures can be formed along the boundary. Furthermore, the locations of the apertures 413 and 412 are not limited to those in FIG. 9. Any other locations along the boundary can be allowed for the apertures.

Fourth Embodiment

Figure 10:
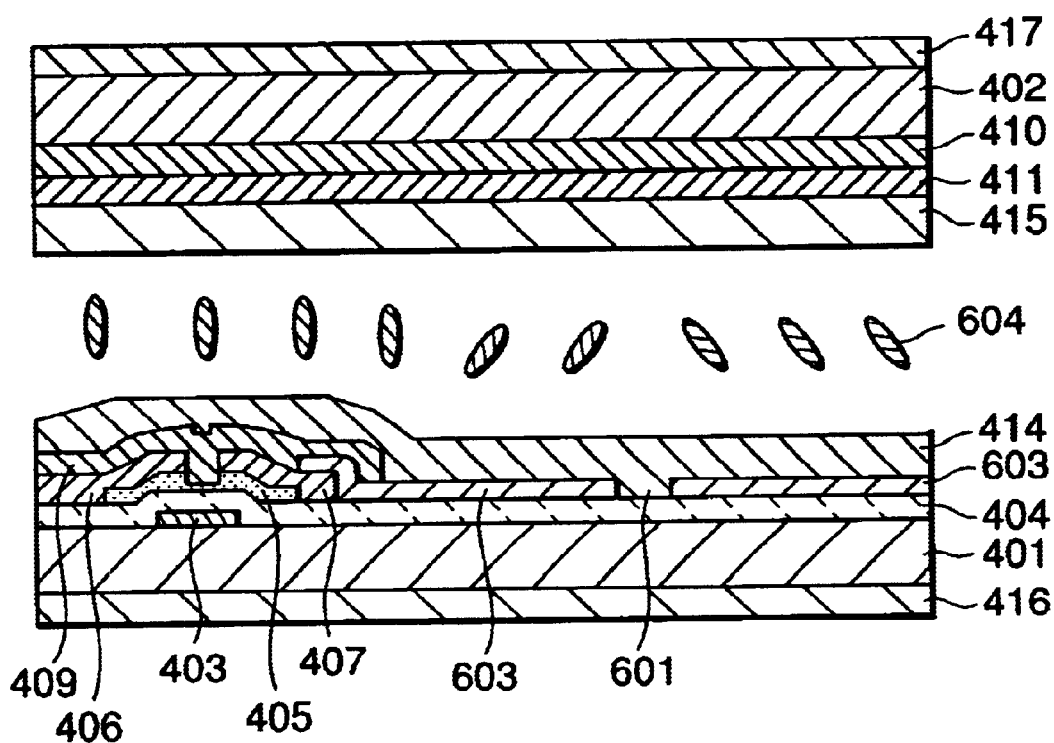
FIG. 10 is a cross section showing part of a pixel in an LCD, according to the fourth embodiment of the present invention.
Figure 11:
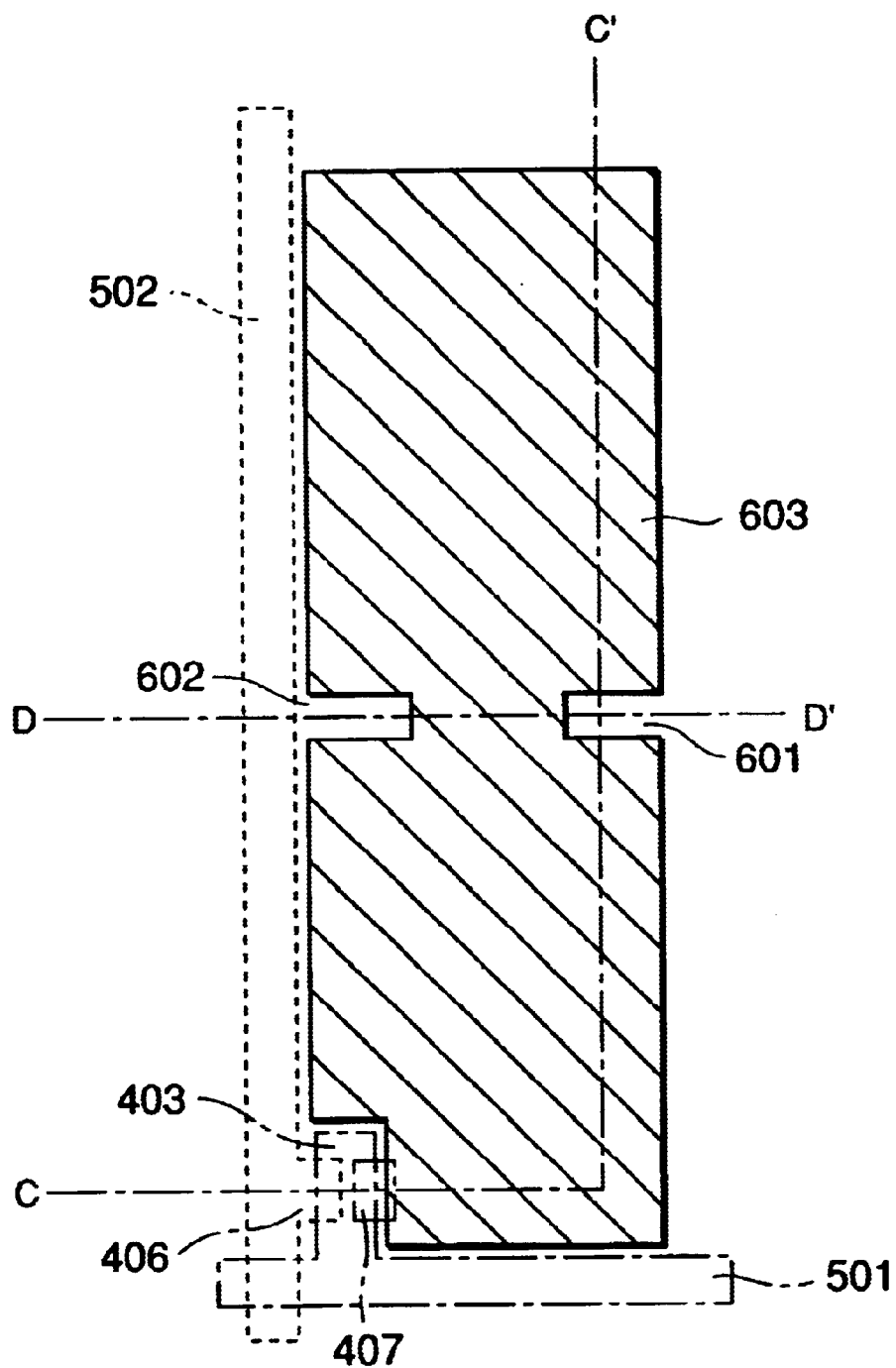
FIG. 11 is an aerial view off the upper part of the pixel in the LCD in FIG. 10.
Figure 12:
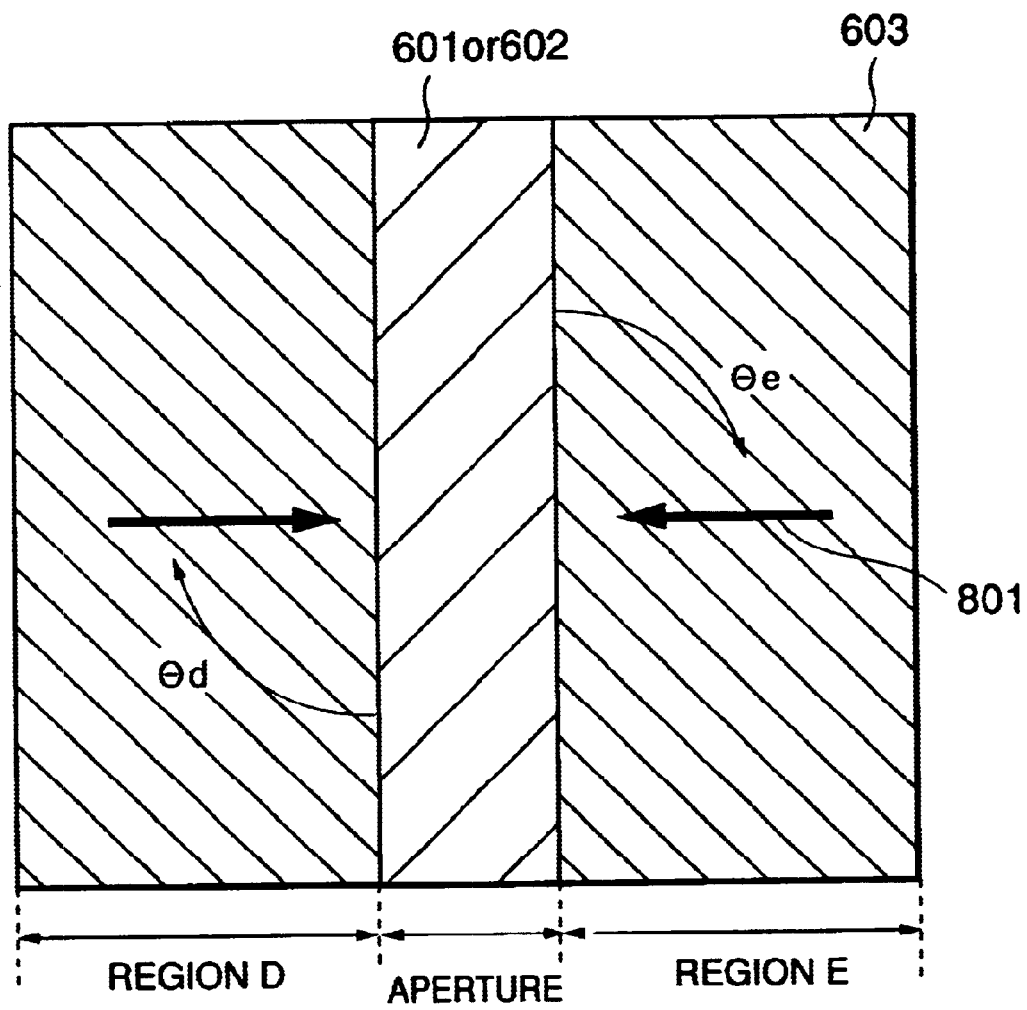
FIG. 12 illustrates the directions of the liquid crystal molecules in the LCD shown in FIG. 10.

Next, an LCD, according to the fourth embodiment of the present invention, will be described with reference to FIGS. 10 to 12. FIG. 10 is a cross section illustrating part of a pixel in the LCD when cut along a line CC' in FIG. 11, according to the fourth embodiment. FIG. 11 illustrates an aerial view of part of the pixel in the LCD.

The LCD structure of the fourth embodiment is different from that of the third embodiment in the following points:
1. As shown in FIGS. 10 and 11, apertures 601 and 602 are formed on an electrode 603;
2. As shown in FIG. 11, a boundary line DD' running between differently oriented upper and lower regions 603 is parallel to a gate wiring 501; wherein concave apertures 601 and 602 are formed along the boundary line DD'; and
3. As also shown in FIG. 11, the two differently oriented upper and lower regions 603 are vertically formed along a drain wiring 502 (an optical orientation process is accordingly executed); as shown in FIG. 12, representing directions 801 of the liquid crystal molecules 604 in the respective regions E and D (i.e., the upper and lower regions 603) resulting from projecting the above molecules 604 onto the substrate 401, above which the apertures 601 and 602 are formed, point to the apertures 601 and 602 (i.e., the boundary line DD' in FIG. 11); the representing directions 801 are at respective certain angles of θd and θe to the extending direction of either one of the aperture 601 or 602 where the angles θd and θe are greater than 0°, but less than 180°.

The result of the LCD of the fourth embodiment is quite similar to that of the first embodiment.

Furthermore, the LCDS of the respective first to fourth embodiments, according to the present invention, can naturally be driven in any one of an active matrix drive mode, a simple matrix drive mode, and a segment drive mode.

Results of the Invention

In summary, as described above, an LCD according to the present invention is one with a vertical orientation mode, where liquid crystal molecules are either vertically or almost vertically pre-oriented and they turn to be oriented horizontally when a certain voltage is applied, as well as regions of liquid crystal molecules with differing orientations, where the liquid crystal molecules have a negative dielectric anisotropy. Also, the LCD has an aperture formed on an electrode, which is formed on the surface of a substrate, along the boundary between the differently oriented adjacent regions. This structure prevents a possible expansion of the poorly oriented, liquid crystal molecules region of the boundary so that the orientation of each region can be stably controlled. Also, a possible deformation of each region can be prevented. As a result, the area division ratio among the regions is kept to be a fixed value. Besides, possible changes in the gray levels of each pixel caused by being viewed from a variety of view points is controlled so that a display with a wide-angle field of view can be provided. Moreover, the display can be provided at high response speed.

An LCD and its manufacturing method, according to the present invention, have been described in connection with several preferred embodiments. It is to be understood that the subject matter encompassed by the present invention is not limited to that specified embodiment. On the contrary, it is intended to include all alternatives, modifications, and equivalents as can be included within the spirit and scope of the following claims.

What is claimed is:

1. A liquid crystal display (LCD), comprising:

a first substrate;

a second substrate opposing to said first substrate;

liquid crystal molecules sandwiched between said first substrate and said second substrate;

a plurality of pixel electrodes formed on said first substrate; and an alignment layer formed on said pixel electrodes which orients said liquid crystal molecules on said alignment layer;

wherein a plurality of differently oriented regions are formed in said alignment layer on each of said plurality of pixel electrodes, each of said pixel electrodes comprises at least one aperture formed under a boundary between adjacent differently oriented regions of said alignment layer, and a minimum width of the at least one aperture of said each of said pixel electrodes is equal to a width of a defectively oriented region of said liquid crystal molecules on said boundary between said adjacent differently oriented regions of said alignment layer.

2. The LCD, as claimed in claim 1, wherein said alignment layer orients said liquid crystal molecules to be vertical or almost vertical to said plurality of pixel electrodes when no electric field is applied between said plurality of pixel electrodes on said first substrate and a common electrode on said second substrate.

3. The LCD, as claimed in claim 1, further comprising:

a common electrode formed on said second substrate, wherein said common electrode has at least one aperture.

4. A method of fabricating a liquid crystal display (LCD), comprising:

forming a plurality of pixel electrodes on a first substrate, forming at least one aperture in each of said pixel electrodes;

depositing an alignment layer over the resultant surface processed in said forming at least one aperture;

generating adjacent differently oriented regions and a boundary between said adjacent differently oriented regions in the alignment layer on each of said pixel electrodes; and sandwiching liquid crystal molecules between said first substrate and a second substrate opposing to said first substrate, wherein a minimum width of the at least one aperture of each of said pixel electrodes is equal to a width of a defectively oriented region of said liquid crystal molecules on said boundary between said adjacent differently oriented regions of said alignment layer.

5. The method as claimed in claim 4, wherein said alignment layer orients said liquid crystal molecules to be vertical or almost vertical to said plurality of pixel electrodes when no electric field is applied between said plurality of pixel electrodes on said first substrate and a common electrode on said second substrate.

6. The method as claimed in claim 4, further comprising:

forming a common electrode on said second substrate; and forming at least one aperture in said common electrode in a region opposing said pixel electrode.

7. The method as claimed in claim 4, wherein said generating differently oriented regions comprises exposing ultra violet light to said alignment layer.

* * * * *